US009660526B2

(12) United States Patent
Li

(10) Patent No.: US 9,660,526 B2
(45) Date of Patent: May 23, 2017

(54) VOLTAGE CONVERTER HAVING ADJUSTABLE DRIVING SIGNAL FREQUENCY

(71) Applicant: SKYWORKS SOLUTIONS, INC., Woburn, MA (US)

(72) Inventor: Hai-Bo Li, Wuxi (CN)

(73) Assignee: Skyworks Solutions, Inc., Woburn, MA (US)

( * ) Notice: Subject to any disclaimer, the term of this patent is extended or adjusted under 35 U.S.C. 154(b) by 40 days.

(21) Appl. No.: 14/287,253

(22) Filed: May 27, 2014

(65) Prior Publication Data

US 2015/0349633 A1 Dec. 3, 2015

(51) Int. Cl.
*H02M 3/158* (2006.01)
*H02M 1/00* (2006.01)

(52) U.S. Cl.
CPC .... *H02M 3/158* (2013.01); *H02M 2001/0032* (2013.01); *Y02B 70/16* (2013.01)

(58) Field of Classification Search
CPC .... H02M 3/158; H02M 3/156; H02M 3/1588; H02M 3/157; H02M 2001/0032; Y02B 70/1466; Y02B 70/16
See application file for complete search history.

(56) References Cited

U.S. PATENT DOCUMENTS

| | | | | |
|---|---|---|---|---|
| 2007/0252568 A1* | 11/2007 | Chien | ...................... | H02M 1/44 323/284 |
| 2008/0265849 A1* | 10/2008 | Lee | ......................... | H02M 1/36 323/238 |
| 2011/0122660 A1* | 5/2011 | Cacciotto | .......... | H02M 3/33515 363/21.18 |
| 2011/0193539 A1* | 8/2011 | Schmidt | ................ | H02M 3/156 323/282 |
| 2012/0153919 A1* | 6/2012 | Garbossa | .............. | H02M 3/156 323/284 |
| 2012/0161738 A1* | 6/2012 | Nakashima | ........... | H02M 3/158 323/284 |
| 2012/0281447 A1* | 11/2012 | Heo | ..................... | H02M 3/1588 363/74 |
| 2012/0299565 A1* | 11/2012 | Zhang | ................. | H02M 3/1588 323/282 |
| 2012/0299569 A1* | 11/2012 | Zhang | ................. | H02M 3/1563 323/283 |
| 2013/0249517 A1* | 9/2013 | Shiraishi | ................. | G05F 1/468 323/283 |

* cited by examiner

Primary Examiner — Gustavo Rosario Benitez
(74) Attorney, Agent, or Firm — Chang & Hale LLP

(57) ABSTRACT

Systems, circuits, devices and methods related to voltage converters. In some embodiments, a control system for a voltage converter can include a driving unit configured to generate a driving signal having a pulse width and a frequency. The driving signal is provided to a voltage conversion circuit to control conversion of an input voltage into an output voltage. The control system can further include a modulation unit configured to modulate the pulse width of the driving signal based on the output voltage to thereby allow adjustment of the output voltage. The control system can further include a control circuit configured to adjust the frequency of the driving signal based on the modulated pulse width. Such a control system can be useful in situations such as when the output voltage is close to the input voltage, or when a load being driven by the output voltage is relatively low.

14 Claims, 7 Drawing Sheets

VOLTAGE CONVERTER HAVING ADJUSTABLE DRIVING SIGNAL FREQUENCY

TECHNICAL FIELD

This application relate to the field of electronic technique, and more particularly to a voltage converter and a control method used therein.

BACKGROUND

Electronic devices typically include modules such as different subsystems, circuits and so on. For example, tablet computers, smart phones, music players etc. may include therein power amplifiers, monitors and so on. Respective modules of an electronic apparatus typically require different supply voltages for achieving normal operations thereof. For example, an analog power amplifier may require a supply voltage of 3.5 volt, a digital processing module may require different supply voltages of 1.8 volts, 5 volts etc. Moreover, when an electronic apparatus is in different operation modes, the supply voltages required by the respective modules may also vary.

An electronic apparatus is often equipped with a power supply with a specific voltage, for example, in a battery-powered electronic apparatus, the battery may probably only supply a voltage of 3.9 volts to 4.5 volts. To ensure the normal operations of the respective modules in the electronic apparatus, a voltage converter is required to convert a direct current (DC) voltage level (e.g., a voltage from the battery) into another different DC voltage as required by an individual module, that is, a specific input voltage Vin is converted into a different output voltage Vout.

In the conventional voltage converters, for example, electric energy at an input port is transitorily stored in an inductor and/or a capacitor (i.e., a charging process is performed), and thereafter electric energy is released at a different voltage at an output port (i.e., a discharging process is performed), so that the input voltage Vin is converted into the desired output voltage Vout. Accordingly, driving signals are employed to drive a control component (e.g., a switch), by which the charging process and the discharging process are controlled so as to obtain the desired output voltage Vout, that is, a turn-on time Ton during which a corresponding switch is turned on to charge and a turn-off time Toff during which the switch is turned-off to discharge are controlled. The turn-on time Ton corresponds to a pulse width of the driving signals.

In some voltage converters, a situation where the input voltage Vin is very close to the output voltage Vout may occur. In this situation, the turn-on time Ton needs to be shortened so as to ensure the stable output voltage Vout, especially when a load driven by the output voltage Vout is relatively light. However, as limited for example by the reaction time or the like characteristics of an electronic element, a minimum Ton_min of the turn-on time Ton can only be a finite value. In this case, the voltage converters charge and then discharge with the minimum turn-on time at a part of a work cycle, and halt the charging and discharging at the other part of the work cycle, in order to provide a balanced average power, which causes the output voltage to be unstable and causes big ripples to appear. A single charging process and a single discharging process are implemented in each work cycle, and as the work cycle of the voltage converter gets shorter and shorter, that is, the switching frequency becomes higher and higher, the aforesaid problem becomes particularly prominent.

SUMMARY

Aspects of the present application may relate to a voltage converter, application of the voltage converter in each module of an electronic apparatus, and a control method adopted in the voltage converter.

In a voltage converter of the present application, a pulse width (i.e., the turn-on time Ton) can be detected in each work cycle T, T=Ton+Toff, a switching frequency fsw can be adjusted based on the detected pulse width Ton, the switching frequency fsw is used for controlling the work cycle of the voltage converter and equal to a reciprocal of a work cycle T, i.e., fsw=1/(Ton+Toff), thereby the switching frequency is reduced when the input voltage Vin is very close to the output voltage Vout or the load driven by the output voltage Vout is relatively light, thus achieving a relatively low duty ratio, and thereby ensuring a stable output voltage.

In the present application, the duty ratio can be reduced by adjusting the switching frequency based on the pulse width, such that the duty ratio is not limited by the minimum pulse width Ton_min, thus it is possible to maintain a stable frequency switching, and accordingly reduce a switching loss.

BRIEF DESCRIPTION OF THE DRAWINGS

In order to more clearly explain the application, drawings used to describe the embodiments or the conventional technologies are briefly introduced below. The drawings described below are merely some embodiments of the present disclosure, and a person of ordinary skill in the art can also obtain other drawings according to these drawings. Identical reference numerals typically indicate identical components throughout the various drawings.

DETAILED DESCRIPTION

Applications of the Voltage Converter in an Electronic Device

Circuits, methods, apparatus and so on applicable to the voltage converter as described herein can be implemented in various electronic apparatuses, such as mobile telephones, tablet PCs, monitors, e-readers, portable digital media players, etc. Hereinafter, application of the voltage converter in an electronic apparatus will be described briefly with reference to FIGS. 1 and 2.

Figure 1:
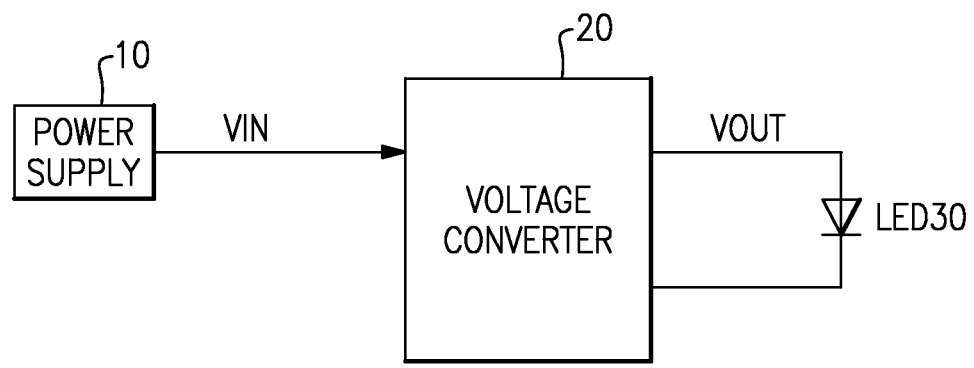
FIG. 1 is a schematic diagram illustrating an example where a voltage converter is used for driving a lighting device in an electronic apparatus.

FIG. 1 is a schematic diagram illustrating an example where a voltage converter is used for driving a lighting device in an electronic apparatus. The lighting device is for example an light emitting diode (LED), which is for example used in an electronic apparatus such as a smart phone, a camera etc. In FIG. 1, a power supply 10 provides the input voltage Vin, a voltage converter 20 receives the input voltage Vin, and converts it into the output voltage Vout to drive the LED 30. The power supply 10 is, for example, a battery, and it may also be any other power supply capable of providing DC.

Figure 2:
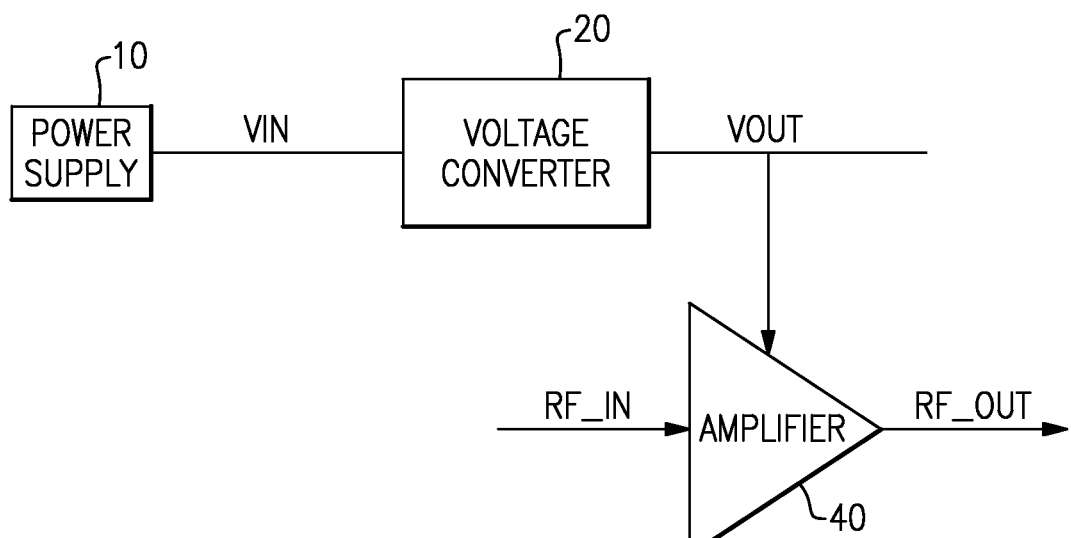
FIG. 2 is a schematic diagram illustrating an example where a voltage converter is used for driving an amplifier in an electronic apparatus.

FIG. 2 is a schematic diagram illustrating an example where a voltage converter is used for driving an amplifier in an electronic apparatus. In FIG. 2, the power supply 10 provides the input voltage Vin to the voltage converter 20, which converts the input voltage Vin into the output voltage Vout to drive an amplifier 40.

The power supply 10 may be a battery in the electronic apparatus or any other power supply capable of providing DC. The amplifier 40 may be a power amplifier used in a smart telephone for amplifying a radio frequency (RF) signal having a relatively low power (RF_in in FIG. 2) into a RF signal having a higher power. The amplified RF signal (RF_out in FIG. 2) can be used for various purposes, e.g., driving antenna of a transmitter in a smart telephone. Accordingly, in a smart phone having 3G, 4G communications standards, the power amplifier can be used for amplifying the RF signal. Since a desired transmission power level may vary depending on a distance that the user is away from a base station, it is desirable to variably control a gain of the power amplifier for amplifying the RF signal.

In practice, the voltage converter shown in FIG. 1 or 2 can be manufactured in a chip, and can also be integrated on a module together with an object driven by it (e.g., LED 30 or amplifier 40), its specific implementation does not constitute a limitation to the present application.

In the description illustrated above with reference to FIGS. 1 and 2, the load driven by the voltage converter is illustrated with the LED and the amplifier as example. However, the voltage converter can drive any other modules or devices that can be configured to operate with a DC voltage.

Voltage Converter

Figure 3:
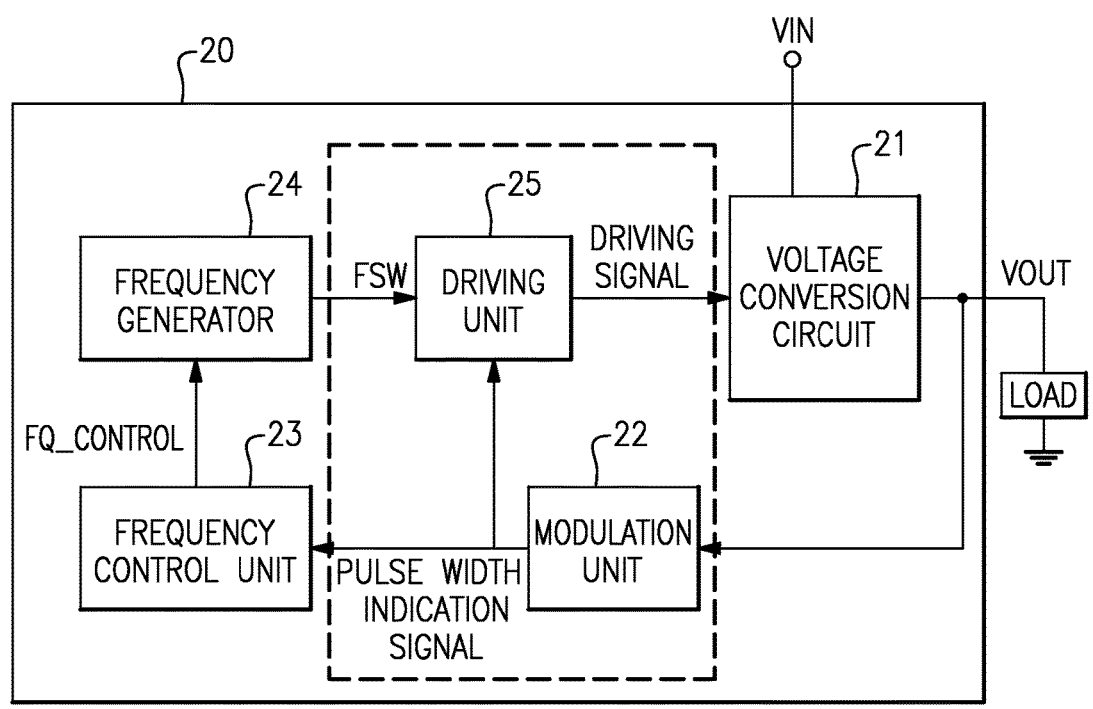
FIG. 3 schematically illustrates a block diagram of a voltage converter in the present application.

FIG. 3 schematically illustrates a block diagram of a voltage converter in the present application. As shown in FIG. 3, the voltage converter 20 may include: a voltage conversion circuit 21 for converting the input voltage Vin into the output voltage Vout to drive the load, with the converting operation being controlled by using a driving signal; a modulation unit 22 for modulating a pulse width of the driving signal based on the output voltage Vout, and outputting a pulse width indication signal indicative of the modulated pulse width; a frequency control unit 23 for generating a frequency control signal FQ_Control which is used to adjust the switching frequency of the driving signal based on the pulse width indicated by the pulse width indication signal; a frequency generator 24 for generating the switching frequency based on the frequency control signal FQ_Control; and a driving unit 25 for generating the driving signal based on the pulse width indication signal from the modulation unit 22 and the switching frequency from the frequency generator 24. The respective units or parts in the voltage converter 20 will be further described below.

Figure 4:
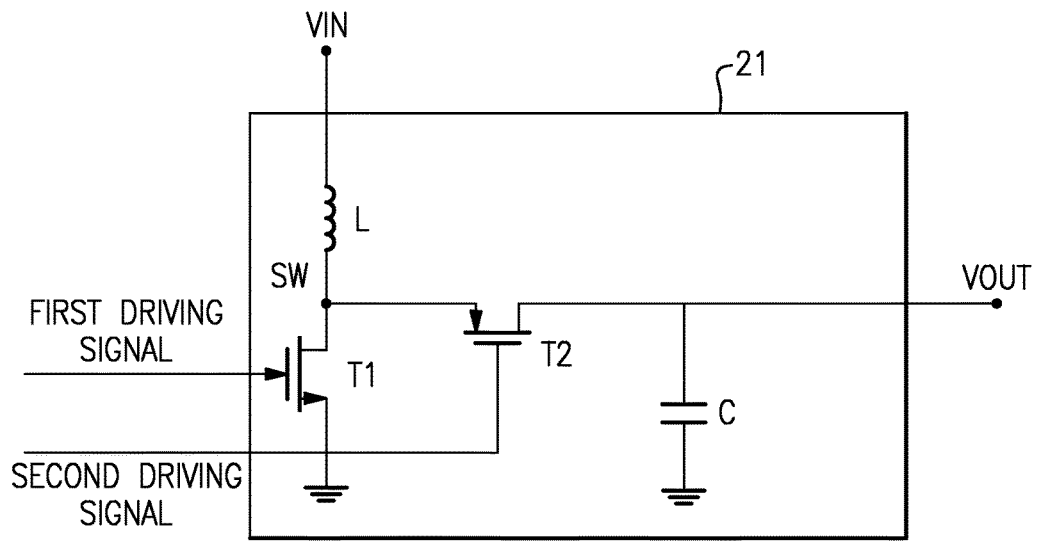
FIG. 4 schematically illustrates an example of a voltage conversion circuit in the voltage converter shown in FIG. 3.

FIG. 4 schematically illustrates an example of the voltage conversion circuit 21 in the voltage converter 20 shown in FIG. 3. As shown in FIG. 4, the voltage conversion circuit 21 may include: an inductor L for receiving the input voltage Vin, being connected to ground via a triode T1, and being charged during the turn-on time Ton and discharged during the turn-off time Toff; a capacitor C, one end of which being connected to a connection point of the inductor L and the triode T1 (i.e., a point SW in FIG. 4) via a triode T2, and the other end of which being grounded, and for ensuring a stable output of the output voltage Vout. The triodes T1 and T2 are control devices for controlling the voltage conversion circuit 21, and control the voltage conversion operation of the voltage conversion circuit 21 under the driving of the above driving signals. The converting operation may include the following charging process and discharging process.

During the charging process, a first driving signal in the driving signal causes the triode T1 to turn on, that is, a conducting path is formed between the inductor L and the ground to produce an inductive current; a second driving signal in the driving signal causes the triode T2 to turn off, that is, an open path is formed between the connection point (i.e., the point SW in FIG. 4) of the inductor L and the triode T1 and a port of the outputs voltage Vout, and the capacitor C is prevented from discharging with respect to the ground. Since the input voltage Vin is a direct current, the inductive current on the inductor L linearly increases in a certain rate which is related to an inductance value of the inductor L, and energy is stored in the inductor L as the increase of the inductive current.

During the discharging process, the first driving signal in the driving signal causes the triode T1 to turn off, that is, an open path is formed between the inductor L and the ground; the second driving signal in the driving signal causes the triode T2 to turn on, that is, a conducting path is formed between the connection point (i.e., the point SW in FIG. 4) of the inductor L and the triode T1 and the port of the output voltage; because of a holding characteristic of the induction current, the current flowing through the inductor L will not immediately become zero, but will instead slowly decrease from a value when the charging is completed, until a next charging process starts or the current value drops to zero; since the triode T1 is turned off, the inductor L can discharge only through the capacitor C, correspondingly, the inductor L starts charging the capacitor C, thereby boosting a voltage between two ends of the capacitor C.

The inductor L absorbs energy during the above charging process, and releases energy during the above discharging process. If the charging process and the discharging process are repeated continually, the output voltage Vout higher than the input voltage Vin can be obtained across the capacitor C. That is to say, a boost conversion is achieved.

The voltage conversion circuit 21 described above with reference to FIG. 4 is only a schematic illustration, for example, the triodes T1 or T2 therein may be replaced with a switch or a diode. If the triodes T2 is replaced with a diode, the second driving signal can be omitted. The voltage conversion circuit 21 in FIG. 3 may also be implemented as a buck conversion circuit 21 where the output voltage Vout is lower than the input voltage Vin, or may be implemented as a boost-buck conversion circuit 21 when necessary, which involves changing the positional relationship between the capacitor C and the inductor L accordingly. Furthermore, the voltage conversion circuit 21 in FIG. 3 may also include more inductors, capacitors, triodes etc., especially in a boost-buck converter. Accordingly, the driving signal may include more driving signals besides the first and second driving signal.

The modulation unit 22 compares the output voltage Vout with a desired supplied voltage Vref, modulates the pulse width of the driving signals according to the comparison result, and outputs a pulse width indication signal indicative of the modulated pulse width.

The modulation unit 22 may for example include an error comparator, which compares the output voltage Vout with a preset reference voltage (corresponding to the desired supplied voltage) and obtains a comparison result. Furthermore, a voltage divider circuit may also be adopted for supplying a part of the output voltage Vout to the error comparator to make a comparison, and the preset reference voltage may also vary accordingly.

When the output voltage Vout deviates from the desired supplied voltage Vref, the modulation unit 22 modulates the pulse width of the driving signals based on deviation information. In the voltage conversion circuit 21 described with reference to FIG. 4, the pulse width indication signal indicative of the modulated pulse width can be obtained based on the comparison result from the error comparator and the current at a grounded terminal of the triode T1. Specifically, a resistor is disposed between the triode T1 and the ground to obtain a sensed signal of the inductive current, and compares this sensed signal with the comparison result from the error comparator so as to generate the pulse width indication signal. Alternatively, in the voltage conversion circuit 21 described with reference to FIG. 4, the pulse width indication signal indicative of the modulated pulse width may also be obtained by comparing the comparison result from the error comparator with a preset reference signal (e.g., a sawtooth wave signal).

The modulation unit 22 may typically include a pulse width modulator (PWM), with which the pulse width of the driving signals can be modulated based on the comparison result. As an example, when the output voltage Vout is greater than the desired supplied voltage Vref, the pulse width modulator can reduce the pulse width of the driving signals; when the output voltage Vout is lower than the desired supplied voltage Vref, the pulse width modulator can increase the pulse width of the driving signals. Other modulators instead of the pulse width modulator may also be used for modulating the pulse width, and specific types of the modulator do not constitute a limitation to the present application.

Figure 5:
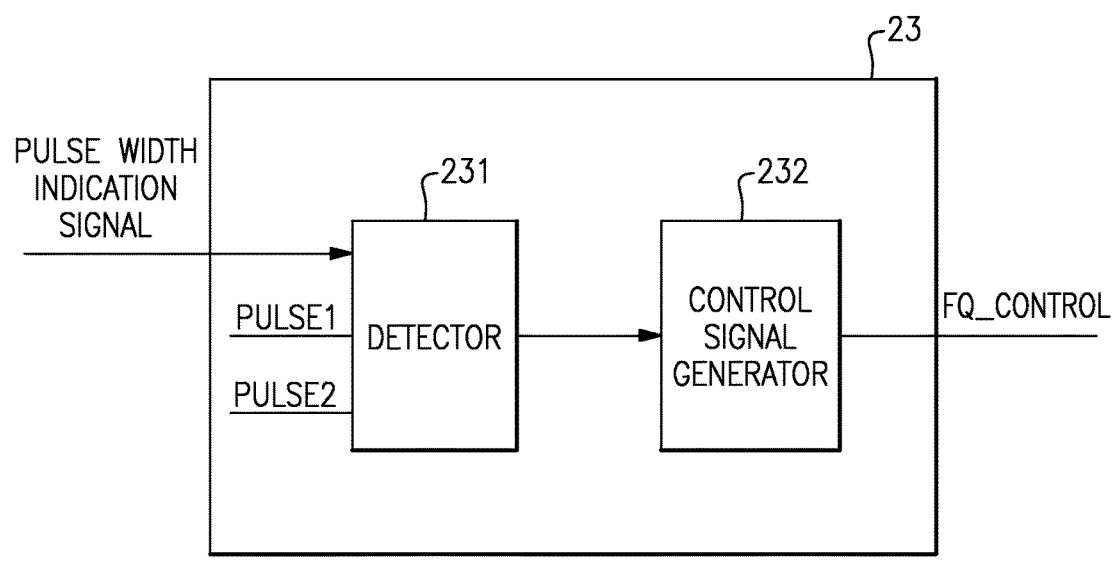
FIG. 5 schematically illustrates a block diagram of a frequency control unit in the voltage converter shown in FIG. 3.

FIG. 5 schematically illustrates a block diagram of the frequency control unit 23 in the voltage converter 20 shown in FIG. 3. As shown in FIG. 5, the frequency control unit 23 may include: a detector 231 for detecting whether the pulse width indicated by the pulse width indication signal outputted from the modulation unit 22 is within a predetermined range; and a control signal generator 232 for generating a frequency control signal FQ_Control for adjusting the switching frequency of the driving signals when the pulse width outputted from the pulse width modulation unit 22 exceeds the predetermined range.

As described above, when the input voltage Vin is very close to the output voltage Vout, or the load driven by the output voltage Vout is relatively light, during the work cycle including a charging process and a discharging process, the voltage converter circuit 21 in the voltage converter 20 needs to have a small duty ratio D to maintain the stable output voltage Vout, where D=Ton/(Ton+Toff), Ton is the turn-on time during which the control device (e.g., triode T1 in FIG. 4) is turned on to charge, Toff is a turn-off time during which the control device is turned off to discharge. As limited by characteristics of an electronic element such as the reaction time thereof, a minimum Ton_min of the turn-on time Ton is typically a finite value. When the turn-on time Ton is less than the minimum value Ton_min, the voltage converter 20 typically does not work normally.

When the pulse width indicated by the pulse width indication signal outputted from the modulation unit 22 is close to the minimum Ton_min, the input voltage Vin is very close to the output voltage Vout or the load driven by the output voltage Vout is relatively light, then the duty ratio D needs to be reduced. Thus, a first threshold value P_th1 can be set for the pulse width, and the first threshold value P_th1 can be greater than but close to the minimum value Ton_min. The predetermined range may be that the pulse width is greater than or equal to the first threshold value P_th1 accordingly, so that when the detector 231 detects that the pulse width indicated by the pulse width indication signal outputted from the pulse width modulation unit 22 is not within the predetermined range (this pulse width is smaller than the first threshold value P_th1), the control signal generator 232 generates a frequency control signal FQ_Control for adjusting the switching frequency of the driving signals. As an example, when the minimum Ton_min is 10 nanoseconds (ns), the first threshold value P_th1 may be set to 20 ns, 25 ns, etc., and a proper threshold value P_th1 may be determined based on the minimum turn-on time Ton_min according to requirements.

Since D=Ton·fsw, where fsw is a switching frequency at which a control device (e.g., triode T1 in FIG. 4) in the voltage conversion circuit 21 operates, when the detector 231 detects that the pulse width indicated by the pulse width indication signal outputted from the modulation unit 22 is less than the first threshold value P_th1, the duty ratio can be lowered by reducing the switching frequency fsw, so as to maintain the stable output voltage Vout. That is to say, when the detector 231 detects that the pulse width indicated by the pulse width indication signal outputted from the modulation unit 22 is less than the first threshold value P_th1, the control signal generator 232 generates a frequency control signal FQ_Control for reducing the switching frequency of the driving signals.

The operations and specific implementations of the frequency control unit 23 will be further described below.

The frequency generator 24 generates a switching frequency based on the frequency control signal FQ_Control. The frequency control signal FQ_Control corresponds to a specific operation mode of the frequency generator 24, so as to ensure that the frequency control signal generator 24 can accurately operate based on the frequency control signal FQ_Control. The frequency generator 24 may be implemented with the existing techniques or a variety of techniques that may appear in the future, and its specific implementations do not constitute a limitation to the present application.

The driving unit 25 may generate the driving signals according to the pulse width indicated by the pulse width indication signal from the pulse width modulation unit 22 and the switching frequency from the frequency generator 24. The driving signals generated by the driving unit 25 correspond to the control devices in the voltage conversion circuit 21. For example, in the case where the transistors T1, T2 in the voltage conversion circuit 21 are to be controlled as described above with reference to FIG. 4, the driving signals generated by the driving unit 25 include the first driving signal and the second driving signal. Specifically, the pulse width of the first driving signal generated by the driving unit 25 is the pulse width indicated by the pulse width indication signal, and the switching frequency of the first driving signal is the switching frequency from the frequency generator 24; thereafter, the second driving signal can be obtained by inverting a phase of the first driving signal. In a case where there are more control devices in the voltage conversion circuit 21, the driving signals generated by the driving unit 25 will include more driving signals, in addition to the first driving signal and the second driving signal. Implementations of the driving unit 25 do not constitute a limitation to the application.

In addition, other modules may be included in the voltage converter 20 if necessary. For example, when the voltage converter 20 needs to switch between different operating modes, it may also include a mode switching module and a mode control module for controlling the mode switching.

According to the above description, it can be known that the frequency control unit 23 can learn the situation that the input voltage Vin is close to the output voltage Vout or the situation of a light load by detecting the pulse width, and can decrease the duty ratio by reducing the switching frequency so as to maintain the stable output voltage Vout. In this case, even if the pulse width of the driving signals is close to the minimum turn-on time Ton_min, it is also possible to maintain the stable output voltage by further reducing the switching frequency fsw, so that the operation of the voltage converter 20 is not limited by the minimum turn-on time Ton_min. In this process, in the case that the input voltage Vin is close to the output voltage Vout or in the case of a light load, the switching frequency fsw can be gradually reduced, rather than being directly suspended during certain work cycle in the conventional voltage converters, its frequency conversion can be very stable, and has low switching loss, which will be described later in details.

In the above descriptions with reference to FIGS. 3-5, for the sake of clarity, the modulation unit 22 and the driving unit 25 (surrounded by dashed lines in FIG. 3) are illustrated as being included in the voltage converter 20. However, the modulation unit 22 and the driving unit 25 may be external to the voltage converter 20, and connected to the voltage conversion circuit 21 and the frequency control unit 23 etc. through signal lines.

Frequency Control Unit in the Voltage Converter

Operations and illustrations associated with the frequency control unit 23 will be further described below.

In the implementation of the current digital circuit, when the detector 231 in FIG. 5 detects that the pulse width indicated by the pulse width indication signal outputted from the modulation unit 22 is less than the first threshold value P_th1, the control signal generator 232 will generate a frequency control signal FQ_Control for halving the switching frequency, so as to halve the switching frequency through the frequency generator; and after a predetermined time period (e.g., 400 μs, 600 μs, etc.), the detector 231 detect again whether the pulse width indicated by the pulse width indication signal outputted from the modulation unit 22 is less than the first threshold value P_th1. If the pulse width is still less than the first threshold value P_th1, the control signal generator 232 continues to generate a frequency control signal FQ_Control for halving the switching frequency; and the process is repeated until the detector 23 detects that the pulse width indicated by the pulse width indication signal outputted from the modulation unit 22 is more than or equal to the first threshold value P_th1. Furthermore, if the frequency generator 24 has a minimum switching frequency fsw_min, this minimum switching frequency will also be considered in the above repetition process. Correspondingly, the detection operation of the detector 231 and the adjustment operation of the control signal generator 232 are repeated, until the pulse width indicated by the pulse width indication signal outputted from the modulation unit 22 is more than the first threshold value P_th1, or the switching frequency is reduced to the minimum switching frequency fsw_min.

In addition to reducing the switching frequency by way of halving the switching frequency, the frequency generator 24 can also reduce the switching frequency by way of reducing it by a specific value, and correspondingly, the frequency control signal FQ_Control generated by the control signal generator 232 instructs the frequency generator 24 to reduce the switching frequency by a specific value.

In the above operation process of the frequency control unit 23, after a stable output voltage is maintained by reducing the switching frequency fsw, if the pulse width modulated by the modulation unit 23 is caused to increase due to an increase of the load driven by the output voltage Vout or other reasons, for example, the detector 231 detects that the pulse width indicated by the pulse width indication signal is more than a second threshold value P_th2, which is greater than the first threshold value P_th1, the control signal generator 232 may control the signal generator 232 to generate a frequency control signal FQ_Control for doubling the switching frequency; and after a predetermined time period (e.g. 400 μs, 600 μs, etc.), the detector 231 detect again whether the pulse width indicated by the pulse width indication signal is greater than the second threshold value P_th2. If the pulse width is still greater than the second threshold value P_th2, the control signal generator 232 generate again a frequency control signal FQ_Control for further doubling the switching frequency, and the detection and the generation of frequency control signal FQ_Control doubling are repeated until the detector 231 detects that the pulse width indicated by the pulse width indication signal is less than or equal to the second threshold value P_th2. In addition, if the frequency generator 24 has a maximum switching frequency fsw_max, it will be also considered in the above repetition process, and correspondingly, the detection operation of the detector 231 and the generation operation of the control signal generator 232 will be repeated, until the detector 231 detects that the pulse width indicated by the pulse width indication signal is less than or equal to the second threshold value P_th2, or the switching frequency is increased to the maximum switching frequency.

As described above, the second threshold value P_th2 of the pulse width is greater than the first threshold value P_th1 thereof. For example, the second threshold value P_th2 may be set to be more than a double of the first threshold value P_th1, so as to meet the hysteresis requirement in the voltage conversion circuit 21. For example, the second threshold value P_th2 may be equal to 3*P_th1, 4*P_th1 and so on. As can be seen, when the detector 231 detects whether the pulse width indicated by the pulse width indication signal is within a predetermined range, the detector 231 may detect whether the pulse width indicated by the pulse width indication signal is less than the first threshold value P_th1 only, or may detect both whether the pulse width indicated by the pulse width indication signal is less than the first threshold value P_th1 and whether it is greater than the second threshold value P_th2.

A reason for the process of generating the frequency control signal FQ_Control to increase the switching frequency fsw as described above lies in: the voltage converter 20 typically has a default switching frequency fsw_default, the various components of the voltage converter 20 can have good performance at this default switching frequency, the voltage converter 20 therefore preferably operates at the default switching frequency or at a frequency close to the default switching frequency; when the duty ratio needs to be increased, the switching frequency of the voltage converter 20 is preferred to be increased and the pulse width thereof is reduced correspondingly, thereby the voltage converter 20 will have excellent performance.

Figure 6:
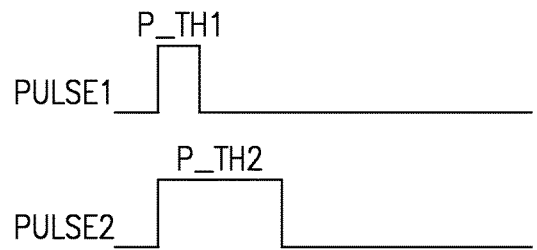
FIG. 6 schematically illustrates a pulse width threshold value adopted in the frequency control unit shown in FIG. 5.

FIG. 6 schematically illustrates two pulse width thresholds in the frequency control unit 23 of the voltage converter 20 as shown in FIG. 5. As shown in FIG. 6, the pulse width of a pulse signal PULSE1 has a first threshold value P_th1, the pulse width of a pulse signal PULSE2 has a second threshold value P_th2, which is more than a double of the first threshold value P_th1. The detector 231 in the frequency control unit 23 may compare the pulse width indicated by the pulse width indication signal with the first threshold value P_th1, or compare the same with both the first threshold value P_th1 and the second P_th2, so as to determine whether the pulse width indicated by the pulse width indication signal is within a predetermined range.

Figure 7:
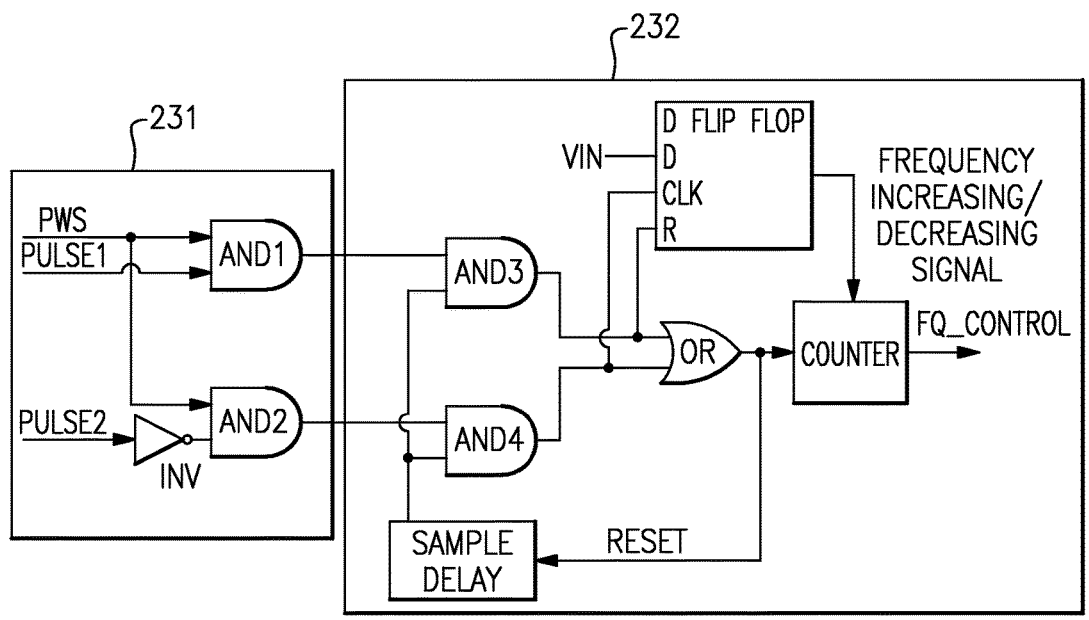
FIG. 7 illustrates a schematic circuit diagram of the frequency control unit in the voltage converter in the present application.

FIG. 7 illustrates a schematic circuit diagram of the frequency control unit 23 in the voltage converter 20 in the present application.

As shown in FIG. 7, in the detector 231, whether the pulse width indicated by the pulse width indication signal PWS outputted from the modulation unit 22 is less than the first threshold value P_th1 of pulse signal PULSE1 is detected by using a logic "AND" gate AND1 which performs a logic "AND" operation on the pulse width indication signal PWS outputted from the modulation unit 22 and the pulse signal PULSE1; after inverting the pulse signal PULSE2 by using an inverter NV, whether the pulse width indicated by the pulse width indication signal PWS outputted from the modulation unit 22 is greater than the second threshold value P_th2 of pulse signal PULSE2 is detected by using a logic "AND" gate AND2 which performs a logic "AND" operation on the pulse width indication signal PWS outputted from the modulation unit 22 and the inverted signal of the pulse signal PULSE2.

In the control signal generator 232, two logic "AND" gates AND3 and AND4 are used for transferring the determination result to a D flip-flop, and thereby generating a frequency increasing signal for increasing the switching frequency and a frequency decreasing signal for decreasing the switching frequency, a counter outputs a final frequency control signal FQ_Control according to the frequency increasing signal or the frequency decreasing signal, a sample delayer serves for spacing a predetermined time interval (e.g. 400 μs, 600 μs, etc.) between two adjacent operations of changing the frequency, thereby avoiding a control confusion caused by frequently increasing/decreasing the switching frequency.

In the frequency control unit 23 in FIG. 7, when the detector 231 detects that the pulse width indicated by the pulse width indication signal PWS outputted from the modulation unit 22 is less than the first threshold value P_th1 of pulse signal PULSE1, the control signal generator 232 controls by using the D flip-flop, and outputs a frequency decreasing signal and, makes the counter to halve the switching frequency or reduce the switching frequency by a specific value, so as to output the frequency control signal FQ_Control. Meanwhile, a reset signal resets a sample delay block, and thereafter delays for a predetermined time period for a next sampling; when the detector 231 detects that the pulse width indicated by the pulse width indication signal PWS outputted from the modulation unit 22 is more than the second threshold value P_th2 of pulse signal PULSE2, the control signal generator 232 controls by using the D flip-flop, and outputs a frequency increasing signal, and makes the counter to double the switching frequency or increase the switching frequency by a specific value, so as to output the frequency control signal FQ_Control. Correspondingly, a reset signal resets the sample delay block, and thereafter delays for a predetermined time period for a next sampling. And so on, and so forth.

Figure 8:
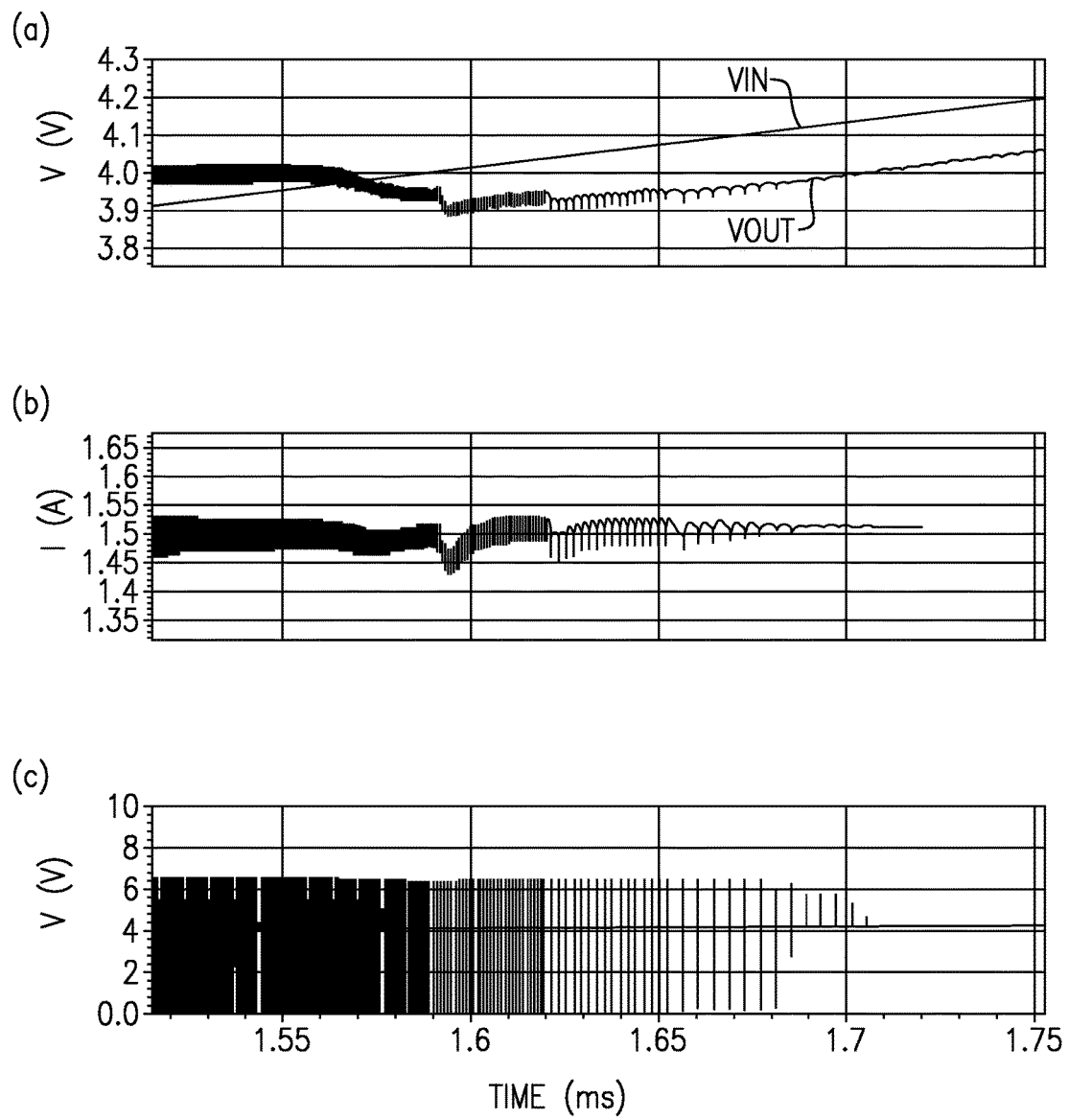
FIG. 8 illustrates a first simulation result of performing voltage conversion by the voltage converter in the present application.

FIG. 8 illustrates a first simulation result of performing voltage conversion by the voltage converter having the frequency control unit 23 shown in FIG. 7. In FIG. 8, the horizontal axis represents time; the longitudinal axis in FIG. 8 (a) represents voltage. FIG. 8 (a) shows curves of the input voltage Vin and the output voltage Vout. The longitudinal axis represents current in FIG. 8 (b), which shows a curve of the load current. The longitudinal axis represents voltage in FIG. 8(c), which shows the curve of the voltage at the point SW shown in FIG. 4, and the curve reflects the switching frequency of the voltage converter 20. As can be seen, after the input voltage Vin is close to the output voltage Vout, the stable output voltage Vout is ensured by reducing the switching frequency fsw, the output voltage Vout in the voltage converter 20 has small ripples, and the frequency switching of the voltage converter 20 is very stable and has low switching loss accordingly.

Figure 9:
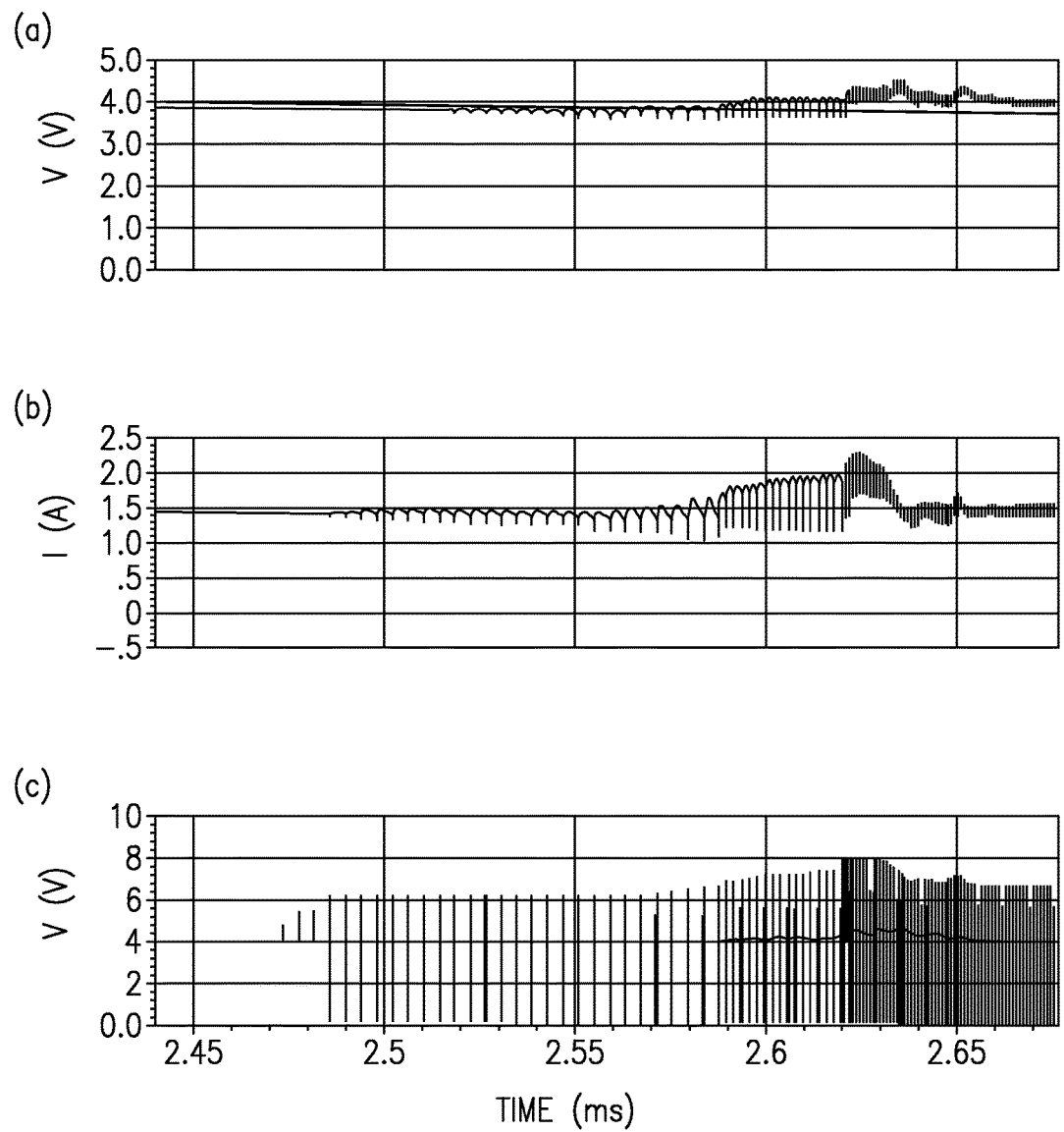
FIG. 9 illustrates a second simulation result of performing voltage conversion by the voltage converter in the present application.

FIG. 9 illustrates a second simulation result of performing voltage conversion by the voltage converter having the frequency control unit 23 shown in FIG. 7. In FIG. 9, the horizontal axis represents time; and the longitudinal axis represents the voltage in FIG. 9 (a), which shows the curves of the input voltage Vin and the output voltage Vout; the longitudinal axis represents the current in FIG. 9 (b), which shows a curve of load current; the longitudinal axis represents the voltage in FIG. 9 (c), which shows the curve of the voltage at a point SW shown in FIG. 4, where the curve reflects the switching frequency of the voltage converter 20. As can be seen, after the input voltage Vin is close to the output voltage Vout and the switching frequency is at its minimum value, if the input voltage Vin decreases and is deviated from its output voltage Vout, then the switching frequency fsw is increased gradually and it is operated at a switching frequency close to or equal to its default switching frequency. This ensures a stable output voltage Vout with small ripples, and the switching frequency is very stable and the voltage converter has low switching loss accordingly.

Control Method Employed in the Voltage Converter

Figure 10:
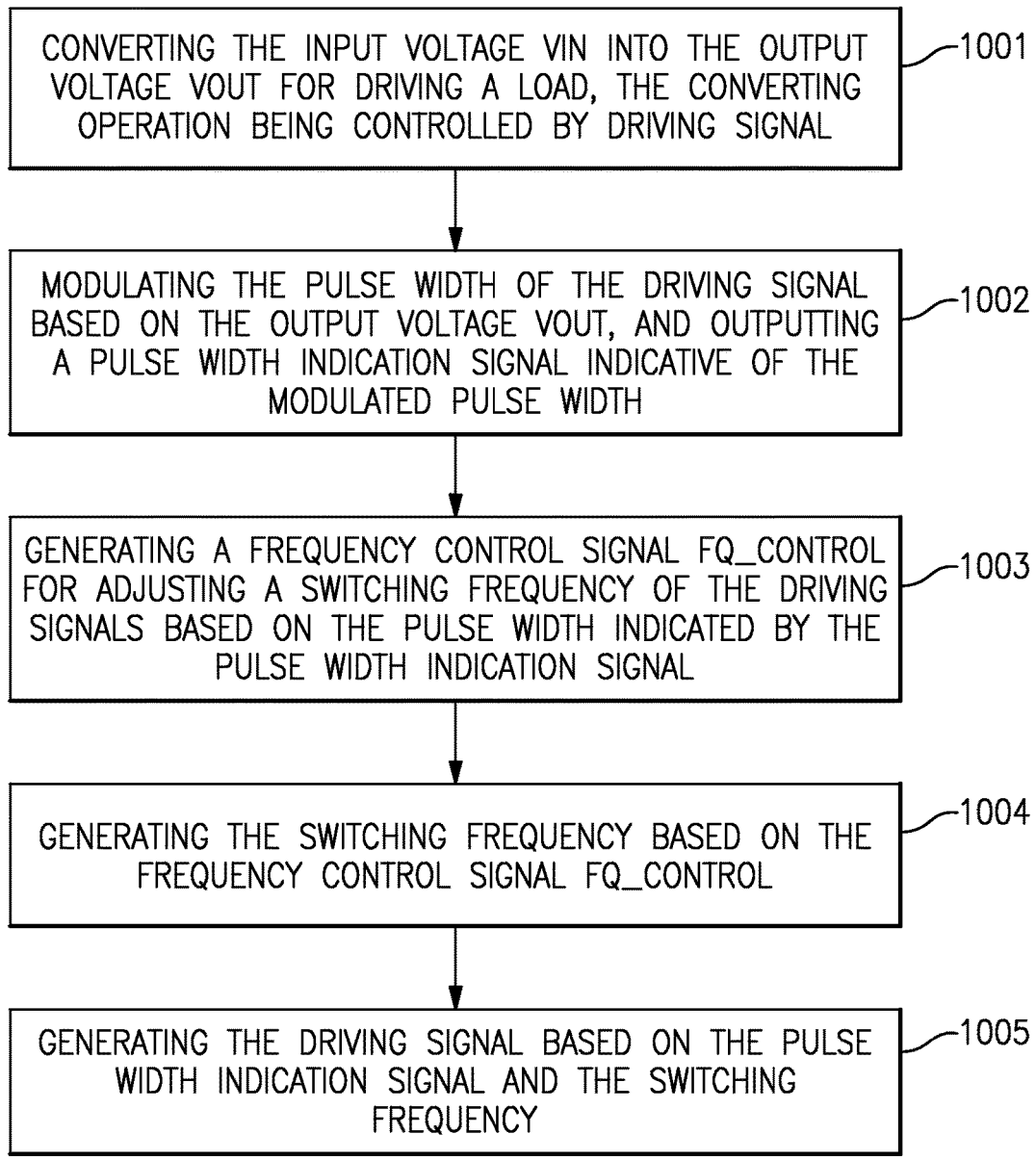
FIG. 10 illustrates a flowchart of an example operation method of the voltage converter in the present application.

FIG. 10 illustrates a flowchart of an example operation method 100 of the voltage converter 20 in the present application. As shown in FIG. 10, the operation method 100 of the voltage converter 20 may include: converting the input voltage Vin into the output voltage Vout to drive the load, with the converting operation being controlled by driving signal (1001); modulating the pulse width of the driving signal based on the output voltage Vout, and outputting a pulse width indication signal indicative of the modulated pulse width (1002); generating a frequency control signal FQ_Control for adjusting the switching frequency of the driving signal based on the pulse width indicated by the pulse width indication signal (1003); generating the switching frequency based on the frequency control signal FQ_Control (1004); and generating the driving signal for controlling the converting operation based on the pulse width indication signal and the switching frequency (1005).

In 1003, generating the frequency control signal FQ_Control for adjusting the switching frequency of the driving signals based on the pulse width indicated by the pulse width indication signal may include: detecting whether the pulse width is within a predetermined range; when the pulse width exceeds the predetermined range, generating the frequency control signal FQ_Control for adjusting the switching frequency of the driving signal.

The detecting whether the pulse width indicated by the pulse width indication signal is within a predetermined range may include: detecting whether the pulse width indicated by the pulse width indication signal is less than a first threshold value P_th1, which is determined by a minimum turn-on time Ton_min of a switch in the voltage converter 20. Alternatively, whether the pulse width indicated by the pulse width indication signal is within a predetermined range may include detecting both whether the pulse width indicated by the pulse width indication signal is less than a first threshold value P_th1 and whether the pulse width indicated by the pulse width indication signal is more than the second threshold value P_th2, with the second threshold value P_th2 being greater than the first threshold value P_th1, and preferably is more than a double of the first threshold value P_th1.

When the pulse width indicated by the pulse width indication signal is less than the first threshold value P_th1, the generating the frequency control signal FQ_Control for adjusting the switching frequency of the driving signals may include: generating a frequency control signal FQ_Control for halving the current frequency or reducing it by other amounts. When the pulse width indicated by the pulse width indication signal is greater than the second threshold value P_th2, the generating the frequency control signal FQ_Control for adjusting the switching frequency of the driving signals may include: generating a control signal FQ_Control for doubling the current switching frequency or increasing it by other amounts. Moreover, the detection is repeated after a predetermined time period, and when the pulse width indicated by the pulse width indication signal exceeds the predetermined range, the frequency control signal FQ_Control for adjusting the switching frequency of the driving signals is generated again, until the modulated pulse width is within the predetermined range.

When the voltage converter works by in accordance with the method 100, the case that the input voltage Vin is close to the output voltage Vout and the case of a light load can be learned by detecting the pulse width, and the duty ratio can be lowered by reducing the switching frequency so as to maintain the stable output voltage Vout, so that the operation of the voltage converter is not limited by the minimum turn-on time Ton_min. Since the switching frequency fsw can be gradually reduced, rather than being directly suspended during a certain work cycle in the conventional voltage converters, its frequency conversion is very stable, and the voltage converter has low switching loss.

In the various examples described herein, references are made to triodes. It will be understood that such triodes can include transistors such as field-effect transistors (FETs). Such FETs can include, for example, MOSFET devices and/or transistors implemented in other process technologies. Other types of transistors can be utilized to implement one or more features of the present disclosure.

A person skilled in the art can understand that, for the convenience and simplicity of description, the specific implementations of embodiments of the method described above can be referred to the corresponding process in foregoing product embodiments.

Some or all of the steps of the method described with reference to FIG. 10 can used in the voltage converter described with reference to FIGS. 3-7, and can be used in any other voltage converter. Said method may be executed and completed by a hardware modules or a combination of hardware modules and software modules. The software modules may reside in a random access memory, a flash memory, a read only memory, a programmable read-only memory or an electrical erasable programmable memory, a register among other sophisticated storage medium in the art.

As can be appreciated by a person of ordinary skill in the art, devices and algorithm steps described in combination with the exemplary embodiments disclosed herein can be implemented by way of electronic hardware, or a combination of computer software and electronic hardware. These functions are to be executed by hardware manner or software manner depends upon the particular application and design constraints of the present application. A person skilled in the art can use different ways to achieve the described functions with respect to each specific application, but such implementation should not be construed as going beyond the scope of the present invention.

Principles and advantages of the application described hereinabove are applicable to any system and apparatus that needs DC-DC voltage conversion. Such systems with DC-DC voltage converters can be implemented in various electronic apparatuses. The electronic apparatuses can include, but are not limited to, consumer electronic products, parts of the consumer electronic products, electronic test equipment. The consumer electronic products can include, but are not limited to, a smart phone, a television, a tablet computer, a monitor, a personal digital assistant, a camera, an audio player, a memory and the like. The consumer electronic products can include a multi-chip module, a power amplifier module, and an integrated circuit including a voltage converter.

The above described are only specific implementations of the present application, but the scope of the present application is not limited thereto, and any alternatives and equivalents that can be easily conceivable by a person skilled in the art within the technical scope disclosed by the present application should be encompassed within the scope of protection of the present application.

The invention claimed is:

1. A control system for a voltage converter, the control system comprising:
   a driving unit configured to generate a driving signal having a pulse width and a frequency, the driving signal being provided to a voltage conversion circuit to control conversion of an input voltage into an output voltage;
   a driving unit configured to generate a driving signal having a pulse width and a frequency, the driving signal being provided to a voltage conversion circuit to control conversion of an input voltage into an output voltage;
   a modulation unit configured to modulate the pulse width of the driving signal based on the output voltage to thereby allow adjustment of the output voltage; and
   a frequency control unit configured to generate a frequency control signal when the modulated pulse width is outside a selected range to thereby adjust the frequency of the driving signal, the frequency control unit including a detector configured to receive a pulse width indication signal indicative of the modulated pulse width and compare it to first and second threshold pulses having widths representative of lower and upper limits of the selected range, respectively, the detector including a first AND gate and a second AND gate, the first AND gate generating a first output that is an AND-combination of the pulse width indication signal and the first threshold pulse, the second AND gate generating a second output that is an AND-combination of the pulse width indication signal and an inverse of the second threshold pulse.

2. The control system of claim 1 wherein the frequency control unit further includes a control signal generator having a logic circuit configured to receive the first and second outputs of the detector and generate the frequency control signal.

3. The control system of claim 2 wherein the frequency control signal is provided to a frequency generator, the frequency generator configured to decrease or increase the frequency of the driving signal based on the frequency control signal.

4. The control system of claim 1 wherein the frequency control signal is configured to provide a decrease in the frequency of the driving signal when the modulated pulse width is less than the first threshold pulse width.

5. The control system of claim 4 wherein the first threshold pulse width is selected to be greater than a minimum turn-on time of the voltage conversion circuit.

6. The control system of claim 5 wherein the decrease in the frequency of the driving signal allows a duty ratio of the voltage conversion circuit to be decreased without further decrease in the modulated pulse width below the first threshold pulse width.

7. The control system of claim 6 wherein the first threshold pulse width is selected relative to the minimum turn-on time of the voltage conversion circuit to allow regulation of the output voltage when the output voltage is close to the input voltage or when a load driven by the output voltage is relatively low.

8. The control system of claim 1 wherein the frequency control signal is configured to provide an increase in the frequency of the driving signal when the modulated pulse width is greater than a second threshold pulse width.

9. The control system of claim 8 wherein the increase in the frequency of the driving signal allows a duty ratio of the voltage conversion circuit to be increased beyond an increase provided by an increase in the modulated pulse width alone.

10. A method for controlling a voltage converter, the method comprising:
generating a driving signal having a pulse width and a frequency, and providing the driving signal to a voltage conversion circuit to control conversion of an input voltage into an output voltage;
modulating the pulse width of the driving signal to adjust the output voltage, the modulating including generating a pulse width indication signal based on the output voltage; and
adjusting the frequency of the driving signal based on the pulse width indication signal when the modulated pulse width is outside a selected range, the adjusting including comparing the pulse width indication signal to first and second threshold pulses having widths representative of lower and upper limits of the selected range, respectively, the adjusting further including generating a first output resulting from an AND-combination of the pulse width indication signal and the first threshold pulse and generating a second output resulting from an AND-combination of the pulse width indication signal and an inverse of the second threshold pulse.

11. The method of claim 10 further comprising performing a logic operating with the first output and the second output to generate a frequency control signal for adjusting the frequency of the driving signal.

12. An electronic apparatus comprising:
a load configured to utilize a regulated voltage; and
a voltage converter configured to receive a supply voltage and generate the regulated voltage, the voltage converter including a voltage converting circuit configured to receive the supply voltage and generate the regulated voltage, the voltage converter further including a control system having a driving unit configured to generate a driving signal having a pulse width and a frequency, the driving signal being provided to the voltage converting circuit to control the conversion of the supply voltage into the regulated voltage, the control system further including a modulation unit configured to modulate the pulse width of the driving signal based on the regulated voltage to thereby allow adjustment of the regulated voltage, the control system further including a frequency control unit configured to generate a frequency control signal when the modulated pulse width is outside a selected range to thereby adjust the frequency of the driving signal, the frequency control unit including a detector configured to receive a pulse width indication signal indicative of the modulated pulse width and compare it to first and second threshold pulses having widths representative of lower and upper limits of the selected range, respectively, the detector including a first AND gate and a second AND gate, the first AND gate generating a first output that is an AND-combination of the pulse width indication signal and the first threshold pulse, the second AND gate generating a second output that is an AND-combination of the pulse width indication signal and an inverse of the second threshold pulse.

13. The electronic apparatus of claim 12 wherein the electronic apparatus is a portable device powered by a battery.

14. The electronic device of claim 13 wherein the portable device includes a mobile phone, a tablet computer, a display, an eBook reader, or a portable digital media display.

* * * * *